United States Patent
Myrah et al.

(10) Patent No.: US 8,959,233 B2
(45) Date of Patent: Feb. 17, 2015

(54) NETWORK BOTTLENECKS

(75) Inventors: Michael G. Myrah, Tomball, TX (US); Balaji Natrajan, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 516 days.

(21) Appl. No.: 13/033,250

(22) Filed: Feb. 23, 2011

(65) Prior Publication Data

US 2012/0215937 A1  Aug. 23, 2012

(51) Int. Cl.
  *G06F 13/14* (2006.01)
  *G06F 15/177* (2006.01)
  *G06F 13/40* (2006.01)

(52) U.S. Cl.
  CPC ........ *G06F 13/4022* (2013.01); *G06F 2201/81* (2013.01)
  USPC ........... 709/227; 709/228; 709/229; 709/235; 709/232

(58) Field of Classification Search
  CPC .......... G06F 13/4022; G06F 2201/81
  USPC ........... 709/227–229, 232, 235, 230
  See application file for complete search history.

(56) References Cited

U.S. PATENT DOCUMENTS

| | | | |
|---|---|---|---|
| 7,152,111 B2 * | 12/2006 | Allred et al. ................. | 709/227 |
| 7,543,089 B2 | 6/2009 | Nguyen et al. | |
| 7,787,452 B2 | 8/2010 | Jones | |
| 7,990,847 B1 * | 8/2011 | Leroy et al. .................. | 370/216 |
| 8,271,658 B1 * | 9/2012 | Allred et al. ................. | 709/227 |
| 2004/0044771 A1 * | 3/2004 | Allred et al. ................. | 709/227 |
| 2007/0093124 A1 | 4/2007 | Varney et al. | |
| 2007/0300241 A1 | 12/2007 | Prakash et al. | |
| 2009/0007154 A1 | 1/2009 | Jones | |
| 2011/0170464 A1 * | 7/2011 | Sengottaiyan et al. ....... | 370/311 |
| 2011/0264800 A1 * | 10/2011 | Allred et al. ................. | 709/224 |
| 2014/0177429 A1 * | 6/2014 | Patil et al. .................... | 370/216 |

OTHER PUBLICATIONS

Robert C. Elliott, "Information technology—Serial Attached SCSI—2 (SAS-2)," Working Draft American National Standard, Project T10/1760-D, Revision 16, Apr. 18, 2009, 6 p.

* cited by examiner

*Primary Examiner* — Kenneth Coulter
(74) *Attorney, Agent, or Firm* — Conley Rose, P.C.

(57) ABSTRACT

A method comprises receiving a request for a network connection and determining if the requested network connection is available. Based on the network connection not being available, the method comprises incrementing a counter. Based on the counter exceeding a threshold value, the method comprises setting a status indicating a bottleneck condition and further responding to the status indicative of the bottleneck condition.

23 Claims, 5 Drawing Sheets

NETWORK BOTTLENECKS

BACKGROUND

Some network topologies can experience input/output (I/O) bottlenecks when there is a larger number of initiator devices and target devices than there are available communication lanes through the fabric. When either an initiator device or a target device is forced to wait for an available network connection, the I/O is forced to wait until the previously busy network connection is available. Forcing I/O transactions to wait decreases system performance.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used herein, the term "downstream" refers to the direction from an initiator device to a target device. The term "upstream" is the opposite direction, that is, from target device to initiator device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
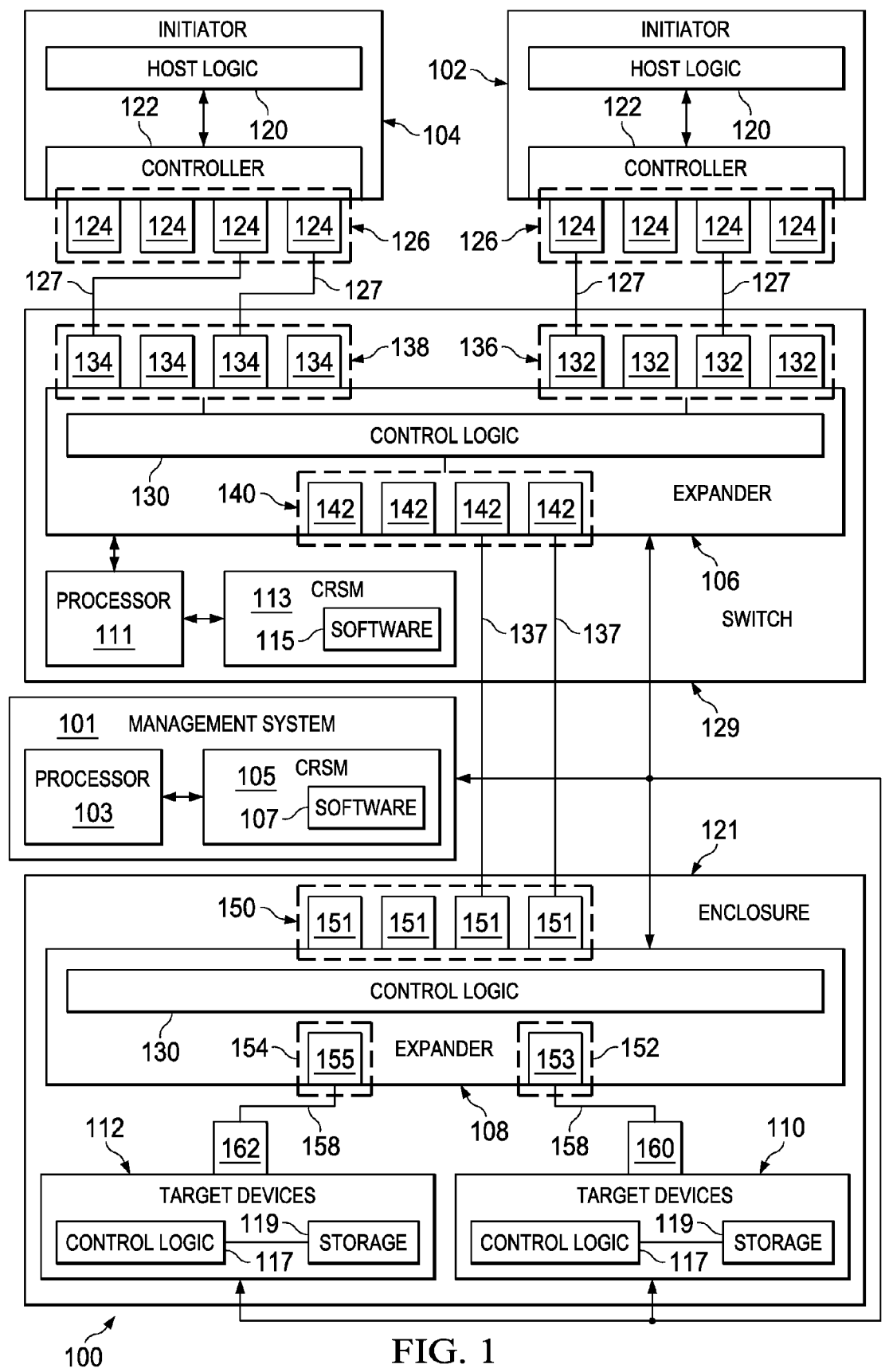
FIG. 1 shows a system in accordance with various embodiments.

FIG. 1 illustrates a system 100 in accordance with various embodiments. As shown, system 100 comprises initiator devices (or simply "initiators") 102 and 104 coupled to a switch 129 which, in turn, couples to an enclosure 121. A management system 101 is also included. While only two initiators 102, 104 are shown, any number (one or more) of initiators can be included in system 100. Similarly, any number of switches 129 and enclosures 121 can be included as well. The enclosure 121 may comprise a support structure such as a rack or sub-assembly within a rack The enclosure 121 may include one or more target devices 110, 112 and such target devices may comprise storage devices (e.g., hard disk drive, tape drive, etc.) or other types of devices accessible to the initiators 102, 104. In the case that the target devices 110, 112 comprise storage devices (e.g., storage 119), the enclosure comprises a storage enclosure which houses the storage devices. The target devices 110, 112 may include control logic 117 that causes the target devices to perform the functionality described herein as attributed to the target devices.

Each initiator 102, 104 comprises host logic 120 coupled to a controller 122. The controller 122 provides an interface between the host logic 120 and one or more ports 126 on the initiator. Each port comprises one or more physical interfaces (PHYs) 124 to which external cables, such as cables 127, can be connected for connecting the initiator to other devices, such as switch 129. Each initiator 102, 104 performs one or more functions. At least one such function is to access one or more of the target devices 110, 112 through the switch fabric comprising switch 129. For example, in the case in which the target devices 110, 112 comprise storage devices, an initiator 102, 104 may attempt to read data from and/or write data to the target device.

The switch 129 comprises an expander 106 coupled to a processor 111. The processor 111 is coupled to a computer-readable storage medium (CRSM) 113 that contains software 115 executable by the processor 111. The CRSM may comprise volatile storage (e.g., random access memory), non-volatile storage (e.g., hard disk drive, read-only memory, compact disk read-only memory (CD-ROM), etc.), or combinations thereof. The software 115 causes the processor 111 to perform a variety of functions. One such function is to configure the expander 106 to, for example, specify how packets are to be routed through the expander.

The expander 106 includes multiple ports 136, 138, and 140 (and in general any number of ports), and each port includes one more physical interfaces (PHYs) 132, 134, and 142 to which cables 127, 137 can be connected as desired. Not all PHYs on the initiators 102, 104 and expander 106 are necessarily connected together via cables.

The expander 106 includes control logic 130 which functions to receive a message (also called a packet or command) on one of its PHYs from one device, such as an initiator 102, 104, and routes that message out through another PHY to another device such as enclosure 121. The expander 106 can route messages in both directions—from initiator 102, 104 to target device 110, 112, and from target device 110, 112 to initiator 102, 104.

The enclosure 121 may also include an expander 108 to bi-directionally route messages between switch 129 and the target devices 110, 112. The expander 108 in the enclosure includes ports 150, 152, and 154, and in general may include any number of ports. Port 150 in the example of FIG. 1 includes four PHYs 151 while ports 152 and 154 include one PHY each—PHYs 153 and 155, respectively. Cables 158 may be used to connect PHYs 153 and 155 on the expander to PHYs 160 and 162 on the target devices 110, 112. Expander 108 also includes control logic 130 to analyze incoming messages to the expander and determine through which PHY that message should be forwarded.

Figure 2:
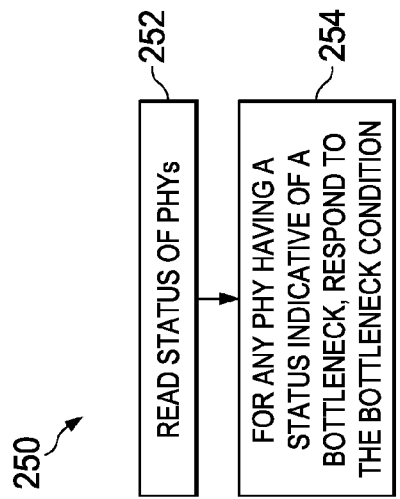
FIG. 2 shows an embodiment of control logic.

The control logic 117 in target devices 110, 112 the host logic 120 in initiators 102, 104 and the control logic 130 in each expander 106, 108 can be implemented as a discrete circuit or as programmable logic. FIG. 2 shows one such implementation as a processor 168 coupled to a CRSM 170 which contains software 172 which is executed by processor 168. CRSM 170 may comprise volatile storage (e.g., random access memory), non-volatile storage (e.g., hard disk drive, read-only memory, compact disk read-only memory (CD-ROM), etc.), or combinations thereof. In the case of the expanders and target devices, the control logic 130, 117, may also contain counters 174. Counters can also be included with each initiator's host logic 120 as desired. In some embodiments, the counters 174 are implemented in software executing on processor 168, while in other embodiments, the counters are implemented in a non-programmable hardware circuit. The use of the counters 174 is explained below.

In some embodiments, system 100 implements the serial-attached small system computer interface (SAS) protocol. However, other communication connection-oriented protocols can be used as well. When an initiator 102, 104 needs to access a target device 110, 112, the initiator generates a request message to open a connection to the specified target device. If the SAS protocol is used, the message generated by the initiator to open the connection is an "OPEN address frame." An OPEN address frame may include, among other pieces of information, the destination SAS address and the source SAS address. In some embodiments, such requests are referred to as Requests for Connection and include OPEN address frames and all other such messages. The Request for Connection is transmitted to the switch expander 106. Switch expander 106 responds by determining which PHY (PHYs 142 in the example of FIG. 1) will be the appropriate PHY to use in the connection between initiator and target device. The expander 106 then forwards the Request for Connection through that PHY to the downstream expander 108, which performs the same function of determining which PHY 153 or 155 to use as part of the connection to the relevant target device 110, 112. If all of the PHYs along the requested connection pathway from initiator device to target device are available, meaning such PHYs are not being used and are not designated for use by another initiator-target device connection pathway that is also being formed, then the initiator device is granted access to the connection. Once the connection is established, the target device 102, 104 can issue additional messages to access the target device 110, 112 (e.g., reads, writes, etc.).

At any step along the way when attempting to form a connection, an expander may determine that the needed PHY is already in use as part of another connection, or has already been designated for use in another connection that is being formed. When an expander receives an OPEN address frame but the needed PHY is not available, the expander will generate a reply message that indicates that the connection request cannot be granted at the current time because the needed PHY is not available, but that the initiator may wait for the PHY to become available. In the context of the SAS protocol, such a reply message is called an Arbitration In Process message having a status of "Waiting on Connection" also referred to herein as AIP(WOC).

If expander 106 in switch 129 determines that a PHY needed to complete a request for a connection is not available, expander 106 generates and replies to the initiator 102, 104 with an AIP(WOC) message. An AIP(WOC) message means that a connection using the needed PHY already exists. A related type of message is an AIP(WAITING ON PARTIAL) message, referred to as "AIP(WOP)." The AIP(WOP) message in the SAS protocol means that the needed PHY is part of a connection that is actively being formed, but not yet completely formed. For ease of discussion, such reply messages will be referred to generically as "Connection Unavailable" messages. Upon receipt of such Connection Unavailable reply messages, the initiator 102, 104 may wait for the requested connection to be available, at which time the expander sends a message to the initiator indicating that the requested connection is now available.

The condition in which a requested connection cannot be completed (e.g., due to use of a needed PHY by a connection between another initiator/target device pair) is indicative of a bottleneck in the switch fabric. In accordance with various embodiments, the system 100 determines whether a bottleneck exists and the location of the bottleneck (e.g., which PHY in the switch fabric is the source of the bottleneck). In some embodiments, a bottleneck is detected by counting the number of Connection Unavailable messages sent back to an initiator. Such messages indicate that a request for a network connection is waiting to be granted due to an unavailable PHY. Further still, in various embodiments, the number of Connection Unavailable messages is counted per a predetermined period of time to determine if a high frequency/rate of Connection Unavailable messages are detected associated with a given PHY. A high frequency of Connection Unavailable messages (e.g., the occurrence of more than a threshold number of Connection Unavailable messages in a predetermined time period for a given PHY) means that a bottleneck has occurred with regard to that particular PHY. Various embodiments of how the bottlenecks are detected and how the system 100 responds to detected bottlenecks will be further explained below.

Count Each Connection Unavailable Message Generated by an Expander

Figure 3:
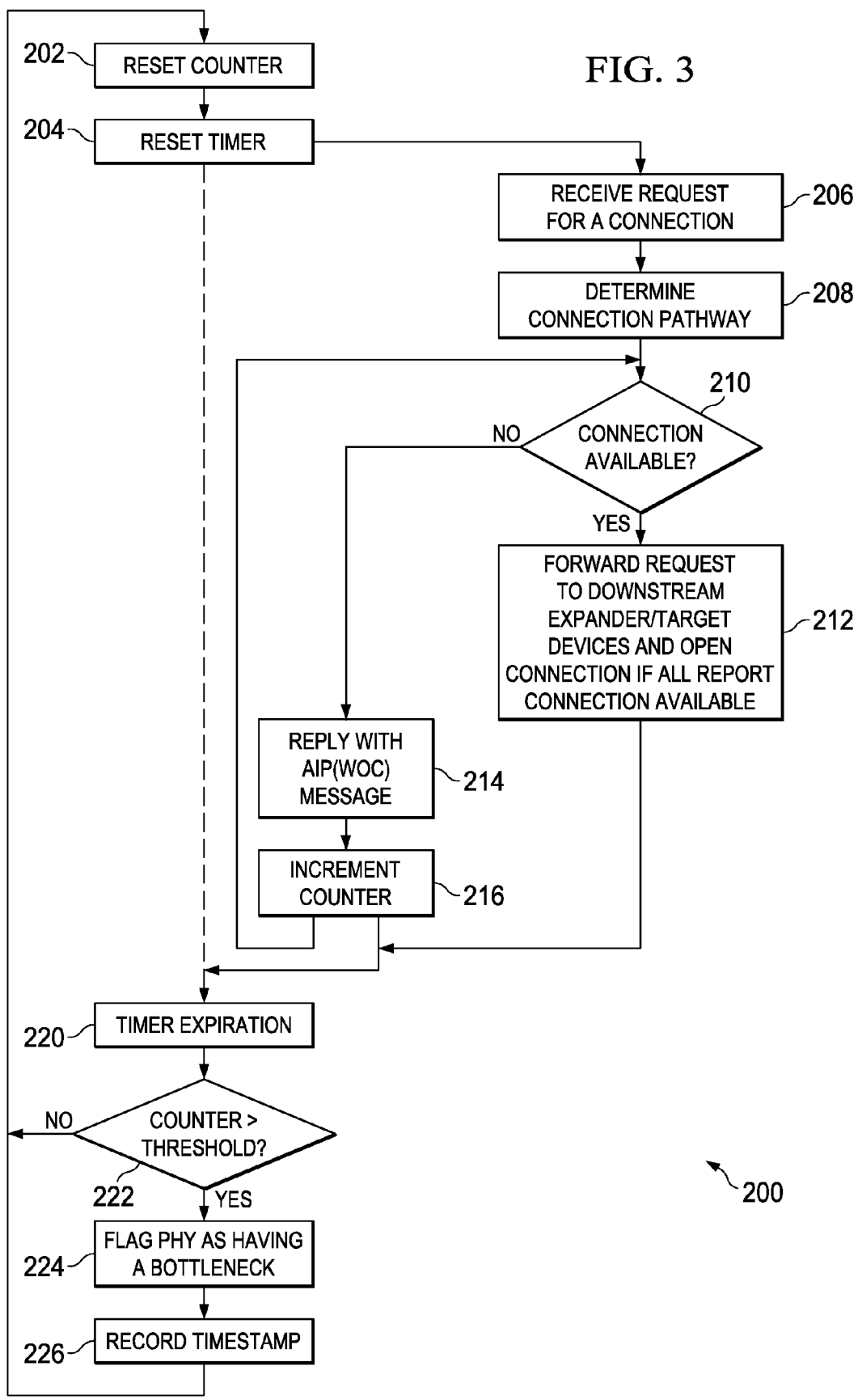
FIG. 3 shows a method in accordance with various embodiments for counting various types of network messages.

FIG. 3 illustrates a method 200 by which each expander 106, 108 or target device 110, 112 counts the number of Connection Unavailable messages generated by that expander. The actions depicted in FIG. 3 can be performed in the order shown, or in a different order. Further, two or more of actions can be performed sequentially or in parallel. Method 200 may be performed by the control logic 130 of the expanders.

At 202, the method comprises resetting a counter 174. The counter may be a hardware counter or one implemented in software executed by a processor. In some embodiments, each expander has a separate counter 174 associated with each of its PHYs. The method depicted in FIG. 3 is applicable to one such PHY and associated counter but applies to all such PHYs and counters.

At 204, the method further comprises resetting a timer (e.g., a software or hardware timer) that counts for a predetermined period of time. The predetermined period of time can be hard-coded or programmable by a user. By way of an example, the predetermined period time can be 100 milliseconds, but can be any other period of time as desired.

During the predetermined period of time being measured by the timer ending with timer expiration (220), the method comprises performing actions 206-216. At 206, the method comprises receiving a request to create a connection (Request for Connection) as explained above. The receipt of such requests occur whenever such requests are generated, if at all. Thus, there may or may not be any such requests during a given period of the predetermined time period. If a request for a connection is received, then at 208, the expander determines a suitable connection pathway for to satisfy the connection request. For example, the expander will determine which of its PHYs will be used for the requested connection. That determination will based, in part, on the cables that are connected to its PHYs and which such PHYs thus lead toward the desired target device 110, 112.

Once it is determined which PHY should be used for the desired connection, at 210 the method comprises determining whether the connection (e.g., the needed PHY) is available. If the connection is available, then at 212, the expander forwards the Request for Connection to a downstream expander or target device and the requested connection will be opened and its use granted to the requesting initiator 102, 104 if all devices along the path to the intended target, and including the intended target, report that the desired connection is available.

If, at 210, the connection is not available (e.g., the needed PHY is being used in another connection), the expander generates a Connection Unavailable message (e.g., AIP(WOC), AIP(WOP), etc.) and transmits the reply message back upstream at 214. At 216, the expander then increments the counter associated with the PHY that was needed but was unavailable. Control then loops back to 210 and as long as the PHY remains unavailable, a Connection Unavailable reply message will be repeatedly transmitted upstream and the counter will continue to be incremented.

During the period of time being measured by the timer, multiple Requests for Connection may be received and such requests may originate from different initiators 102, 104 and/or be intended for different target devices 110, 112. The counter 174 incremented at 216 thus may increment when the same connection request is repeatedly held at bay or when different connection requests are received but unable to be granted due to the same PHY being unavailable.

Eventually, the timer will expire at 220. Once the timer expires, the expander determines whether the counter exceeds a threshold. The threshold can be hard-coded or programmable by a user. The combination of the threshold and the period of time measured by the timer define a frequency threshold above which the expander determines that a bottleneck has occurred. If the counter has not exceed the threshold, then control loops back to 202, 204 at which the counter and timer are reset and the process repeats.

If, however, the counter has exceeded the threshold thereby indicating the existence of a bottleneck condition, then the method 200 comprises flagging the PHY as having a bottleneck at 224. Flagging the PHY may include setting a status indicator associated with the PHY to indicate a bottleneck. At 226, a timestamp is also recorded for the detected bottleneck condition for the PHY. In some embodiments, each time a PHY has deemed to have a bottleneck condition (e.g., each time the counter is determined as having exceeded the threshold at 222 following expiration of the predetermined period of time measured by the timer), a separate status and timestamp are recorded for the PHY thereby creating a history log for that PHY. The status, timestamps, and history log may be stored in the CRSM 170 of the expander. Once the status and timestamp are recorded, control loops back to 202, 204 at which the counter and timer are reset and the process repeats.

Figure 4:
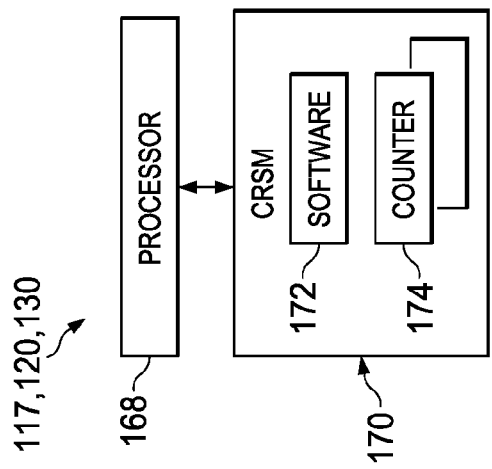
FIG. 4 shows a method of determining the location of the bottlenecks based on the method of FIG. 3.

FIG. 4 illustrates a method 250 by which a computer, such as management system 101 in FIG. 1 identifies the existence and location of bottlenecks in the system 100. The management system 101 couples to each of the expanders 106, 108 and target devices 110, 112. The management system 101 includes a processor 103 coupled to CRSM 105 which contains software 107 executable by the processor 103 to perform the functionality described herein as attributed to the management system. The CRSM 105 comprises volatile memory such as random access memory, non-volatile storage such as a hard disk drive, a CD-ROM, etc., or combinations thereof. In some embodiments, the management system 101 comprises a computer.

At pre-programmed regular intervals or upon command by a user, the management system 101 interrogates each expander 106, 108 to determine if any of such devices has a PHY that has experienced or is experiencing a bottleneck. At 252, the method comprises reading the status of the various PHYs in the system. The status being read may include an indication that the corresponding PHY has experienced a bottleneck (e.g., its counter exceeded a threshold value in a predetermined period of time). In some embodiments, the status may also include a timestamp of when the bottleneck was detected as explained above.

At 254, the management system 101 responds or causes a response to be initiated to any detected bottleneck conditions. The response can be any desired response. Examples of such responses include any one or more of generating a recommendation to add a cable, sending an email, generating a trap (e.g., an simple network management protocol (SNMP) trap), and generate a warning to, for example, an information technology (IT) specialist via a graphical user interface. Referring to the example of FIG. 1, there are only two cables 137 connecting two of the four PHYs 142 and 151 of expanders 106 and 108. The response to the detection of a bottleneck may be to add a third cable interconnecting an additional pair of PHYs 142, 151.

Count Each Forwarded Connection Unavailable Message

The following embodiment is directed to a method by which each expander counts the number of forwarded Connection Unavailable messages that pass through each such expander. A forwarded Connection Unavailable message is a Connection Unavailable that is received by an expander that was generated downstream from that expander by a downstream expander, and forwarded on upstream by the expander to an upstream expander or initiator. Target devices 110, 112 comprise end nodes and thus do not generate Connection Unavailable messages or receive forwarded Connection Unavailable messages.

Figure 5:
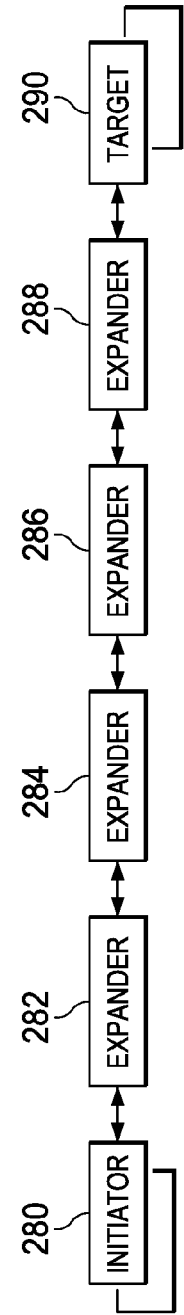
FIG. 5 illustrates an example of a network fabric in accordance with various embodiments.

FIG. 5 illustrates a network fabric comprising one or more initiators 280 coupled to a serially-connected set of four expanders 282, 284, 286, and 288. The downstream-most expander 288 connects to one or more targets 290. If expander 288 (the downstream-most expander) generates a Connection Unavailable message, that message will be forwarded through expanders 286, 284, and 282 back to the initiator 280 that initially requested the connection. As such, expanders 286, 284, and 282 will count the forwarded Connection Unavailable message. Similarly, if expander 286 generates a Connection Unavailable message, that message will be forwarded through expanders 284 and 282 back to the initiator 280 and only expanders 284 and 282 will count the forwarded Connection Unavailable message. If expander 284 generates a Connection Unavailable message, that message will be forwarded through expander 282 back to the initiator 280 and only expander 282 will count the forwarded Connection Unavailable message. Finally, if upstream-most expander 282 generates a Connection Unavailable message, that message will be transmitted upstream to the initiator without passing through any other expander and thus no expander will count the Connection Unavailable message because the Connection Unavailable message is not forwarded on by any intervening expander(s).

Figure 6:
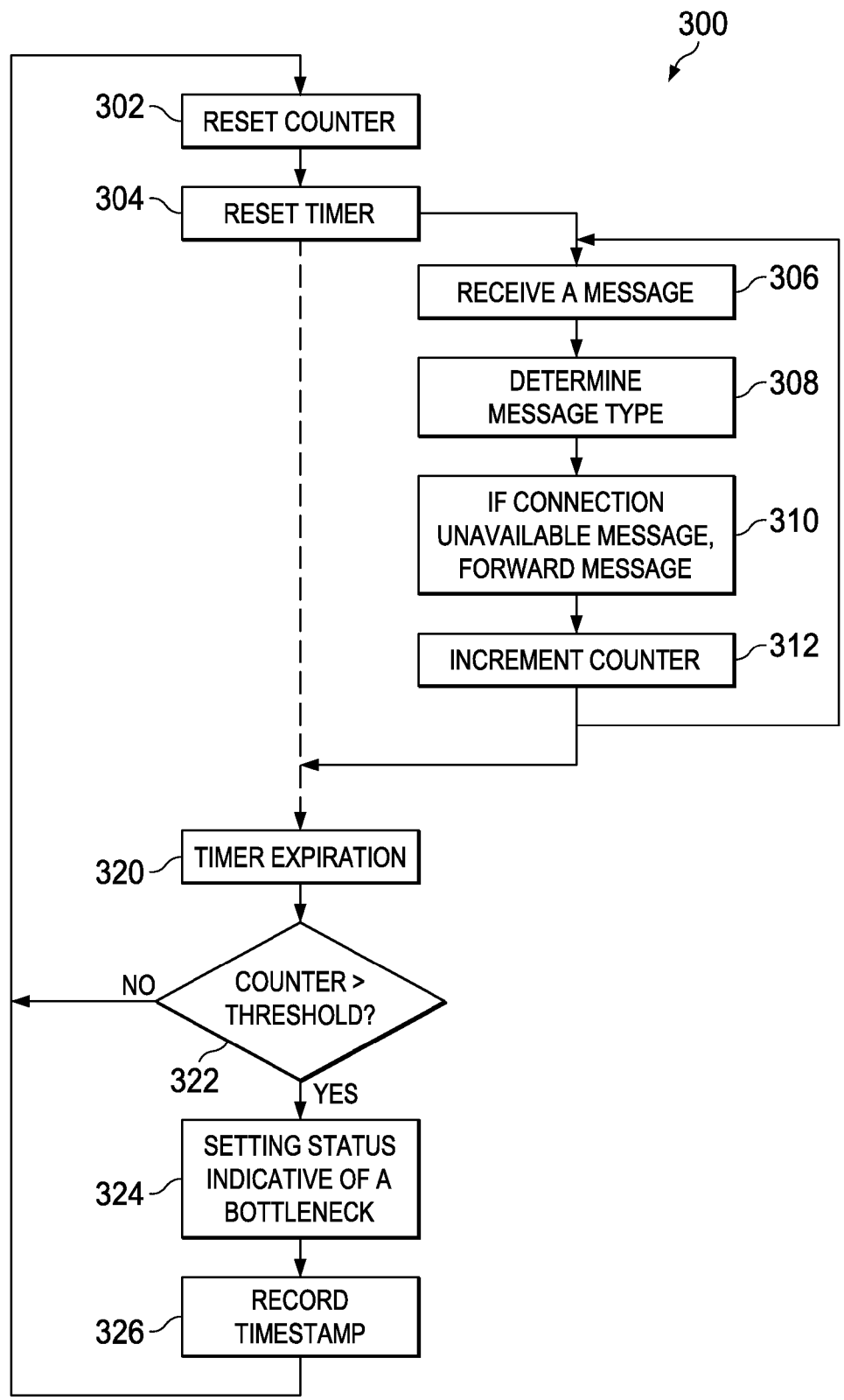
FIG. 6 shows an alternative method in accordance with another embodiment for counting various types of network messages.

FIG. 6 illustrates a method in accordance with the embodiments in which expanders count forwarded Connection Unavailable messages for detecting bottlenecks. The actions depicted in FIG. 6 can be performed in the order shown, or in a different order. Further, two or more of actions can be performed sequentially or in parallel. Method 300 may be performed by the control logic 130 of the expanders.

At 302, the method comprises resetting a counter 174. As explained above, the counter may be a hardware counter or one implemented in software executed by a processor, and each expander has a separate counter 174. In this embodiment, the counters 174 are not associated with any particular PHY. The method depicted in FIG. 6 is applicable to one such PHY and associated counter but applies to all such PHYs and counters.

At 304, the method further comprises resetting a timer (e.g., a software or hardware timer) that counts for a predetermined period of time. The predetermined period of time can be hard-coded or programmable by a user. By way of an example, the predetermined period time can be 30 seconds, but can be any other period of time as desired.

During the predetermined period of time being measured by the timer ending with timer expiration (320), the method comprises performing actions 306-312. At 306, the expander receives a message and, at 308, determines the type of message received. If the received message is a Connection Unavailable message (e.g., AIP(WOC), AIP(WOP), etc.), then at 310 that message is forwarded to an upstream expander or initiator. At 312, as a result of detecting the receipt of Connection Unavailable message or as a result of forwarding the Connection Unavailable message, the counter of the relevant expander is incremented.

In some embodiments, each Connection Unavailable message does not identify the PHY whose unavailability caused a downstream expander or target device to generate the Connection Unavailable message in the first place. As such, each upstream expander only counts the number of such forwarded messages passing through that expander but is not able to identify the downstream PHYs that were unavailable.

In other embodiments, however, each Connection Unavailable message contains, or is otherwise encoded with, an identity of the specific PHY whose unavailability triggered the generation of the Connection Unavailable message in the first place. In such embodiments, each upstream expander receiving and forwarding such messages does have a counter associated with each downstream PHY and that particular counter is incremented at 312.

Once the timer expires (320), the method determining whether the counter exceeds a threshold. The threshold can be hard-coded or programmable by a user. The combination of the threshold and the period of time measured by the timer define a frequency threshold above which the expander determines that a bottleneck has occurred. If the counter has not exceed the threshold, then control loops back to 202, 204 at which the counter and timer are reset and the process repeats.

If, however, the counter has exceeded the threshold thereby indicating the existence of a bottleneck condition, then the method 300 comprises setting a status indicator to indicate the existence of a bottleneck (324). At 326, a timestamp is also recorded for the detected bottleneck condition. In some embodiments, each time a bottleneck condition is detected, a separate status and timestamp are recorded thereby creating a history log. The status, timestamps, and history log may be stored in the CRSM 170 of the expander. Once the status and timestamp are recorded, control loops back to 302, 304 at which the counter and timer are reset and the process repeats.

In some embodiments as explained above, each Connection Unavailable message does not indicate the specific PHY that triggered the generation of the Connection Unavailable message. Thus, when an upstream expander has a counter value that exceeds the threshold in the predetermined period of time, a bottleneck condition is deemed present, but not necessarily in that particular expander. Rather, the bottleneck condition is present with respect to a downstream expander, but which expander (to the extent there are multiple downstream expanders) has actually experienced the bottleneck condition is not ascertainable based on any one particular expander setting a status to indicate a bottleneck condition based on forwarded Connection Unavailable messages. As such, the process of localizing the source of the bottleneck condition to a particular is more complicated than in the embodiment of FIGS. 3 and 4.

Figure 7:
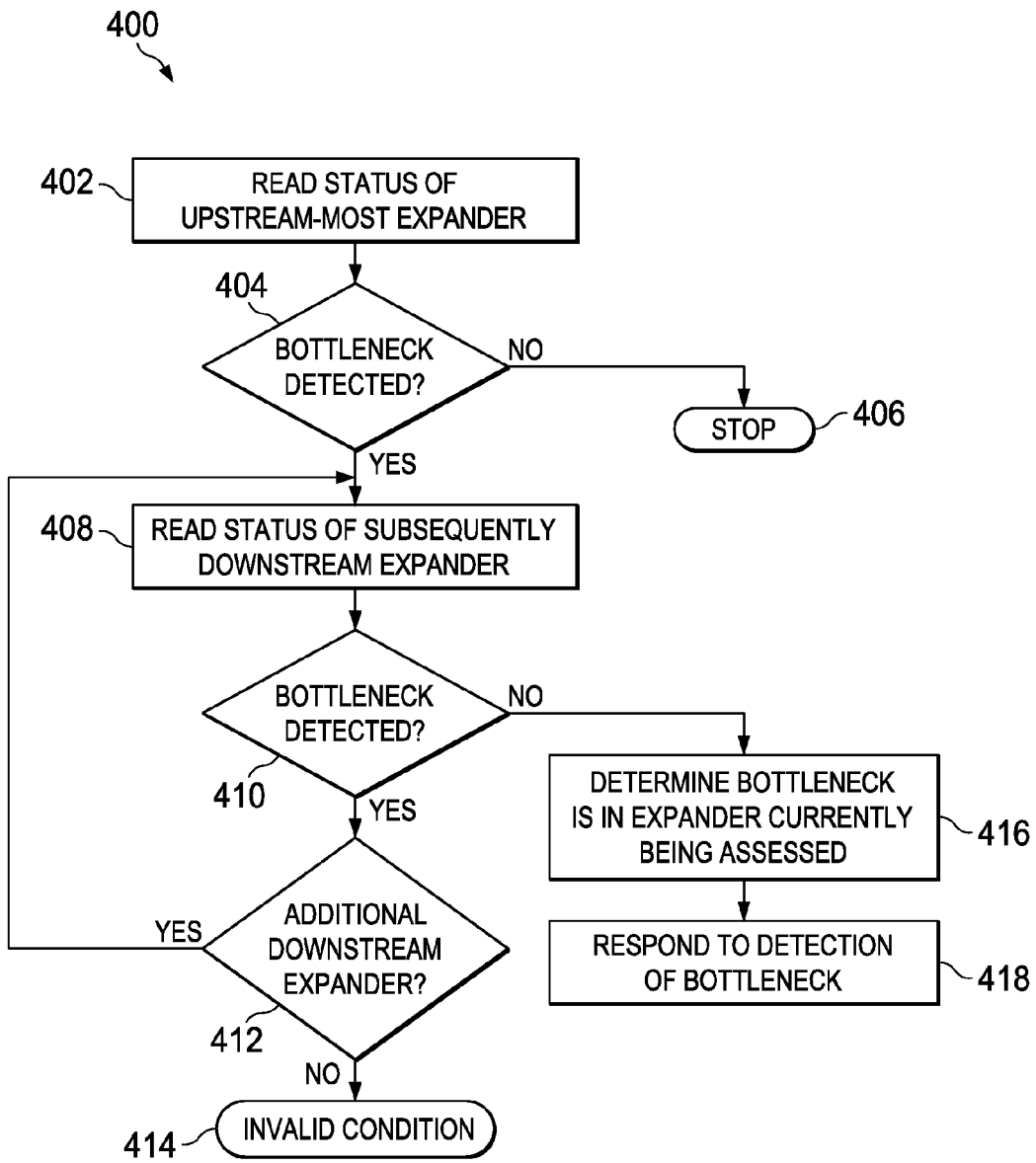
FIG. 7 shows a method of determining the location of the bottlenecks based on the alternative method of FIG. 6.

FIG. 7 shows one such embodiment of a method 400 for identifying the location of a bottleneck in a system in which each expander counts the number of forwarded Request Unavailable messages that pass through that expander but that were generated by a downstream expander. The method 400 of FIG. 7 may be performed by a computer, such as management system 101 in FIG. 1. At pre-programmed regular intervals or upon command by a user, the management system 101 performs method 400.

The method begins at 402 with reading the status of the upstream-most expander (expander 282 in the example of FIG. 5). At 404, the method determines whether the status is indicative of a bottleneck condition (e.g., forwarded Request Unavailable message count having exceeded a threshold value in a predetermined period of time). If no bottleneck condition is detected, which means that no expander has generated a sufficient number of Request Unavailable messages to exceed the threshold in the predetermined period of time, then the process ceases at 406.

If, however, the status of the upstream-most expander indicates a bottleneck, then the method continues at 408 by reading the status of the next subsequently downstream expander in the fabric (e.g., expander 284 following expander 282). If the status of that expander indicates a bottleneck, then at 412 it is determined whether an additional downstream expander is present. If so, control loops back to 408 and 408 and 410 repeat with each subsequent downstream expander in series.

This process continues until a currently assessed expander has as a status that does not indicate a bottleneck. In that case, control moves to 416 at which the method determines that the location of the bottleneck resides with the expander currently being assessed (i.e., the expander not reporting a bottleneck at decision 410). Finally, at 418, the method comprises responding to the detection of the bottleneck condition. The response can be any desired response such as those listed above including any one or more of generating a recommendation to add a cable, sending an email, generating a trap (e.g., an simple network management protocol (SNMP) trap), and generate a warning to, for example, an information technology (IT) specialist via a graphical user interface.

A "no" answer to decision 412 is an invalid condition and, as such, should never occur. A "no" answer to decision 412 denotes a state in that a bottleneck has been indicated by the current expander's status (410) but that particular expander is the downstream-most expander. The downstream-most expander, such as expander 288 in FIG. 5, does not receive and forward Connection Unavailable messages. As such, a downstream-most expander should never have a status indicative of a bottleneck based on counting forwarded Connection Unavailable messages.

The above discussion is meant to be illustrative of the principles and various embodiments of the present invention. Numerous variations and modifications will become apparent to those skilled in the art once the above disclosure is fully appreciated. In the embodiments discussed above, the network fabric includes one or more switches. In other embodiments, switches are not provided. In such embodiments, expanders are included, but not necessarily contained in switches. It is intended that the following claims be interpreted to embrace all such variations and modifications.

What is claimed is:

1. A method executing on computer hardware, comprising:
   receiving a request for a network connection;
   determining if the requested network connection is available;
   based on the network connection not being available, incrementing a counter;
   based on said counter exceeding a threshold value within a predetermined time period, setting a status indicating a network bottleneck condition;
   determining a location of the network bottleneck condition from among a plurality of expanders downstream from one another; and
   responding to said status indicative of the network bottleneck condition.

2. The method of claim 1, wherein receiving, determining, and incrementing are performed during the predetermined period measured by a timer.

3. The method of claim 2 further comprising resetting the timer and counter based on an expiration of the timer and repeating said receiving, determining, and incrementing after resetting said timer and counter.

4. The method of claim 1 further comprising recording a timestamp associated with setting the status.

5. The method of claim 1 further comprising generating a reply message indicating that the requested connection is in use and is being waited on.

6. The method of claim 1 further comprising, indicating which physical interface of a plurality of physical interfaces is associated with the bottleneck condition.

7. The method of claim 1 wherein responding to said status comprises at least one of generating a recommendation to add a cable, sending an email, generating a trap, and generate a warning.

8. The method of claim 1, further comprising:
   determining a type of message received; and
   forwarding a Connection Unavailable message to an upstream expander; and
   incrementing a counter of a corresponding expander.

9. The method of claim 1, further comprising maintaining independent counters for each downstream PHY.

10. The method of claim 1, further comprising if a status of an upstream-most expander indicates a bottleneck, then continuing to read a status of a next subsequently downstream expander in a fabric.

11. A method executing on computer hardware, comprising:
    reading status of a first device;
    determining whether status of the first device is indicative of a bottleneck based on a counter exceeding a threshold value within a predetermined time period, said counter incremented when a network connection is not available;
    based on determining that the status of the first device is indicative of a bottleneck, reading status of a second device that is downstream from the first device, and determining a location of the network bottleneck condition from among a plurality of expanders downstream from one another; and
    based on determining that the status of the second device is not indicative of a bottleneck, determining that a congestion point occurred with respect to the second device.

12. The method of claim 11 further comprising based on determining that the status of the second device is indicative of the bottleneck, further reading a status of a third device, downstream from the second device, and determining whether the status of the third device is indicative of a bottleneck.

13. The method of claim 12 further comprising:
    receiving, with the first device, a forwarded message from the second device, wherein said forwarded message indicates a request for a network connection is waiting to be granted;
    forwarding said forwarded message to a device upstream from the first device; and
    incrementing a counter based on said forwarded message.

14. The method of claim 13 further comprising repeating said receiving, forwarding, and incrementing, and further comprising determining whether the counter exceeds a threshold.

15. The method of claim 13 further comprising repeating said receiving, forwarding, and incrementing during a predetermined time period, and further comprising determining whether the counter exceeds a threshold during the predetermined time period.

16. The method of claim 15 further comprising resetting said counter after determining whether the counter exceeds a threshold.

17. The method of claim 15 further comprising setting the status of the first device to be indicative of a bottleneck based on the counter exceeding the threshold.

18. The method of claim 17 further comprising recording a timestamp associated with setting the status.

19. The method of claim 11 further comprising responding to the determination that a congestion point has occurred by way of a recommendation to add a cable.

20. A system, comprising:
    a non-transitory computer-readable storage medium containing software; and
    a processor coupled to the computer-readable storage medium and that executes the software;
    wherein the software causes the processor to:
    read a status of a first device;
    determine whether the status of the first device is indicative of a network bottleneck based on a counter exceeding a threshold value within a predetermined time period, said counter incremented when a network connection is not available;
    based on a determination that the status of the first device is indicative of a network bottleneck, read a status of a second device that is downstream from the first device, and determining a location of the network bottleneck condition from among a plurality of expanders downstream from one another; and
    based on a determination that the status of the second device is not indicative of a bottleneck, determine that a congestion point occurred with respect to the second device.

21. The system of claim 20 further comprising, based on a determination that the status of the second device is indicative of the bottleneck, the software causes the processor to read a status of a third device, downstream from the second device, and determine whether the status of the third device is indicative of a bottleneck.

22. The system of claim 20 wherein the software further causes the processor to respond to the determination that a congestion point has occurred by way of at least one of providing a recommendation to add a cable, sending an email, generating an SNMP trap, and generating a warning.

23. The system of claim 20 wherein the first device comprises an upstream-most expander in a network fabric and said software causes the processor to cease reading the status of other devices for bottlenecks if the first device's status indicates the absence of a bottleneck.

\* \* \* \* \*